Nov. 10, 1970  H. WEH  3,539,842
INDUCTION MHD GENERATOR
Filed Aug. 14, 1967
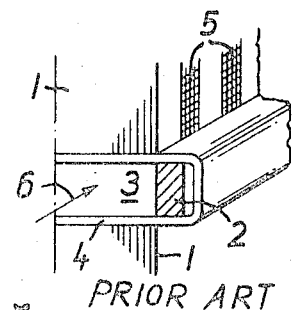
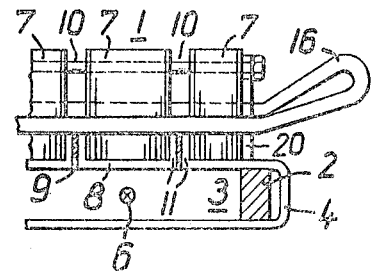
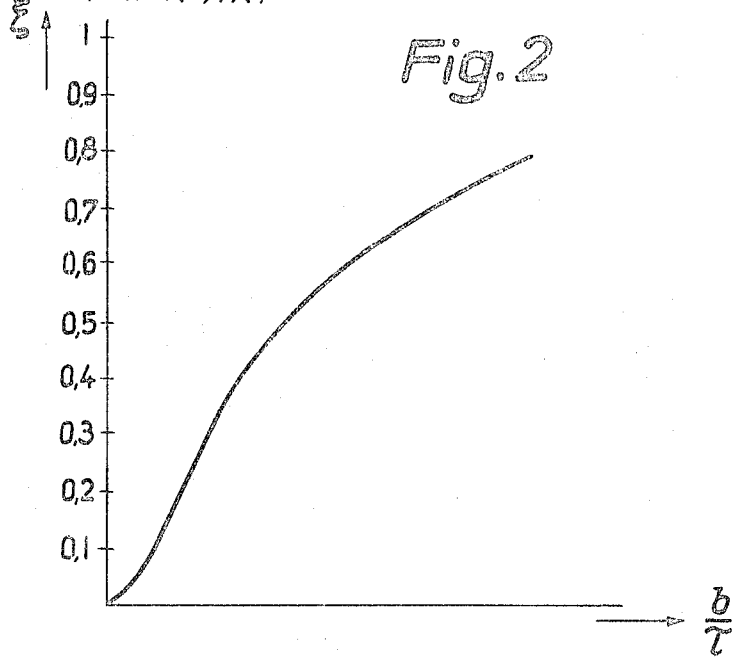
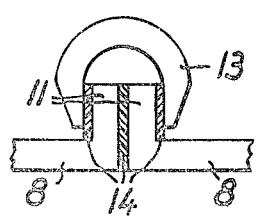
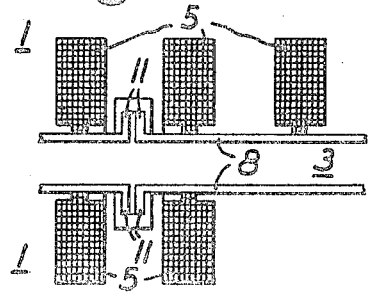
Inventor: Herbert Weh
BY Spencer & Kaye
Attorneys

United States Patent Office

3,539,842
Patented Nov. 10, 1970

3,539,842
INDUCTION MHD GENERATOR
Herbert Weh, 4 Brahmstrasse, 33 Braunschweig, Germany
Filed Aug. 14, 1967, Ser. No. 660,365
Claims priority, application Germany, Aug. 16, 1966,
W 42,211
Int. Cl. H02n 4/02
U.S. Cl. 310—11                                          6 Claims

ABSTRACT OF THE DISCLOSURE

An improvement of an induction MHD generator for the reduction of generator eddy current energy loss. The flow channel for constraining the flow of conductive fluid medium through the generator is divided into a plurality of electrically insulated wall sections.

BACKGROUND OF THE INVENTION

The present invention relates to the field of electric generators, and particularly to generators which directly convert the kinetic energy of a flowing medium into electrical energy.

Devices of this type are generally known as magneto-hydro-dynamic, or MHD, generators and magneto-gas-dynamic, or MGD, generators and act to directly convert the kinetic energy of a flowing medium into electrical energy by the interaction of magnetic fields with the electrically conductive flowing medium. This medium can be a gas, a gas mixture, or a liquid.

According to a first form of construction, MGD generators are arranged with a stationary excitation field and are provided with a channel through which hot, electrically conductive gas, at a temperature of 3000° C., or more, flows at a high velocity. This channel is traversed by a magnetic field which induces an electric field at right angles both to itself and to the direction of flow of the conductive gas. Such devices must be provided with an electrode arrangement for drawing off electrical current from the conductive zones of the gaseous stream.

According to another form of construction, travelling field or so-called induction MHD generators are provided with travelling fields and do not require any output electrodes because, when the arrangement operates as an electric generator, the generated electrical power is produced by currents induced in the stator winding.

It has been found that, insofar as concerns the technological applicability and utility of MHD generators, the electrical conductivity of the flowing medium plays a more important role in travelling field devices than it does in stationary field devices. In travelling field MHD generators, the electrical conductivity of the flowing medium, together with other design parameters, determines the maximum efficiency and power factor which can be obtained. In machines of this type, the flowing medium is usually a liquid metal which, if it is constituted by a properly selected material, will have a higher conductivity, even at low temperatures, than a gas. Such a liquid metal, which is passed through a flow channel made principally of high grade steel, can in practice be an alkali metal with a temperature of over 200° C.

The efficiency of an MHD generator of this type can be improved, as with the well-known principles of design of electric motors and generators, by minimizing stray magnetic flux. This means that the wall of the flow channel, which is transverse to the grooves located within the packet of laminations perpendicular to the flow of current, should have the lowest possible magnetic conductivity or permeability.

The travelling magnetic field of the MHD generator induces eddy currents in the metal walls of the flow channel. These eddy currents, which give rise to heat loss and lower the efficiency of the generator, are proportional to the thickness as well as the electrical conductivity of the material of the walls. These losses can be reduced by constructing the flow channel walls, for example, of austenitic steel which has an electrical conductivity considerably less than that of normal steels.

Losses can further be minimized by reducing the thickness of the wall of the flow channel to its lowest mechanically acceptable limits (approximately 1 mm. or less). This is best accomplished by surrounding the walls with other support material so that the walls alone do not have to hold back the outward forces of the flowing medium. There are limitations on the thinness of the walls however; for example, the walls must be welded in such a way that the flow channel is hermetically sealed.

In spite of the use of austenitic steels and in spite of the construction of the flow channel walls to minimize their thickness, energy losses in the walls remain relatively high compared with the total energy produced by the generator. The absolute loss remains at its highest level, in fact, even when the generator is provided with a small load. It will be shown, in accordance with the present invention, however, that another more satisfactory solution to the problem of eddy currents is possible.

For a better understanding of the background of the invention reference is made to FIGS. 1 and 2 of the drawing wherein FIG. 1 is a partial cross section and perspective view of part of the MHD generator as it is known in the prior art, and FIG. 2 shows the characteristic of certain parameters of the prior art generator as will be explained in detail below.

The MHD generator shown in FIG. 1 comprises two lamination bundles 1 arranged on opposite sides of a flow channel 3. A side conductor 2 provides a return path for electric currents flowing through the fluid medium transversely to the direction of fluid flow indicated by arrow 6. The flow channel 3 is bounded on two sides by the wall 4 and one side by side conductor 2. Grooves 5, which contain the required windings, are located in the lamination bundles 1.

An investigation into the eddy currents of an MHD generator of the type shown in FIG. 1 has shown that they flow through the walls 4 of the channel 3 essentially transverse to the direction of fluid flow 6, then enter the side conductors 2. Because of the increased conductivity of the side conductors, they there increase in density and, other conditions remaining constant, cause the greatest losses.

A reduction in the losses is possible if the galvanic connection between the side conductor and the wall of the flow channel is made discontinuous. A discontinuous connection is not possible however, in particular when the flow channel is filled with the fluid medium.

FIG. 2 shows the dependency of $\xi$ on $b/\tau$ where the factor $\xi$ is the ratio of the channel wall losses per unit volume for an idling generator without side conductors to the losses for an idling generator with infinitely good side conductors and $b/\tau$ is the ratio of generator width to pole pitch. It can be seen from FIG. 2 that the channel losses could be considerably reduced (especially with narrow generators) were it possible to prevent the side conductor from diverting the eddy currents. The selection of the value $b/\tau$ is, however, determined by other design factors of the MHD generator; it is noted, in particular, that very narrow generators with a small $b/\tau$ exhibit disadvantages not present in generators with a large $b/\tau$. Narrow generators possess, for example, an especially high magnetic leakage.

SUMMARY OF THE INVENTION

An object of the present invention therefore is to minimize the eddy currents and therefore the losses in an MHD generator.

This and other objects may be achieved according to the invention by dividing the walls of the flow channels of inductive MHD generators into individual electrically isolated sections. This causes a reduction in the magnetic flux induced voltage per wall section and a corresponding reduction in the eddy currents.

In order to form a closed electrical circuit, the eddy currents will have a component in the direction of the channel length. This part of the path of the eddy currents however is not influenced by the subdivision of the channel according to the invention. Thus the effective electrical resistance which the eddy current will find in the subdivision of the channel wall will not be much less than in the undivided channel wall. However, the magnetic flux, having only the small subdivision of the channel wall will be reduced far more.

The losses per unit volume are therefore reduced in accordance with the curve of FIG. 2. by subdividing the channel walls according to the invention, the generator width $b$ (which now represents the width of the wall section) and in consequent the value $b/\tau$ well be reduced. As is shown by the curve of FIG. 2, for a small value of $b/\tau$ the losses per unit volume will also be small.

BRIEF DESCRIPTION OF THE DRAWINGS

FIG. 1 is a perspective view partly in section of an MHD generator according to the prior art.

FIG. 2 is a diagram showing the dependence of the factor $\xi$ upon the ratio $b/\tau$ in an MHD generator.

FIG. 3 is a cross-sectional view of a part of an MHD generator having channel subdivisions according to one embodiment of the present invention.

FIG. 4 is a fragmentary view showing one way which the channel walls can be electrically insulated and mechanically connected according to one embodiment of the present invention.

FIG. 5 is a cross-sectional view of a part of an MHD generator having the walls of the flow channel subdivided according to another embodiment of the present invention.

DESCRIPTION OF THE PREFERRED EMBODIMENTS

Referring now to the drawings, all figures of which contain identical identification numbers for identical parts of the MHD generator, FIGS. 3, 4 and 5 show different embodiments of the channel wall subdivision according to the invention. FIG. 3 is a cross-sectional view of the MHD generator in the direction of fluid flow 6 having the channel wall subdivided into sections across its width. The laminations 1, divided into individual bundles 7, are provided with a winding 16. The flow channel 3 is of the same construction as the prior art flow channel 3 shown in FIG. 1. The flow channel wall 4 however, is divided at positions 9 in gaps 10 of the lamination bundles 1 into sections 8. It is advantageous in practice to hold together the flanges 11 of sections 8 with the same squeezer yoke 20 that is used to hold the laminations 1. This insures that the flow channel 3 be hermetically sealed.

It makes no difference, in principle, whether the walls 4 are subdivided into individual sections 8 transverse, parallel or at some angle to the direction of flow 6. It is possible even to divide the walls in a combination of directions.

The lower boundary of width of the sections 3 is determined only by the difficulty and cost of manufacturing a hermetically sealed flow channel.

Instead of using the lamination squeezer yoke to simultaneously press together lamination bundles and the sections of wall, the walls may be connected by a spring clamp as shown in FIG. 4. The spring clamp 13 surrounds the flanges 11 of the wall sections 8 and is electrically insulated, as are the sections 8, by insulating strips 14. Since the flanges 11, and therefore also the spring clamp 13, are situated in space that is practically magnetic field free, these elements can be made as strong as is necessary with but a small additional loss of energy due to eddy currents.

The flow channel 3 can also be subdivided in the direction of its length as shown in FIG. 5. A disadvantage of this type of subdivision, however, is that whenever the length of the wall sections 8 is equal to or greater than one pole pitch, the unsymmetry, caused by end-effects due to the finite length of the generator, of the current characteristics of the multiple phase winding is increased.

In any case the connecting flanges 11 should be constructed so as to not disturb the smooth surface within the flow channel 3. As has already been noted the connecting flanges 11 should, as far as possible, be placed in the space having a low magnetic field density; if necessary they can be arranged in special grooves in the bundle of laminations 1. Construction of the flow channel 3 may be made easier, finally, by trading an increased number of sections for an increased thickness of the channel wall.

It will be understood that the above description of the present invention is susceptible to various modifications, changes and adaptations, and the same are intended to be comprehended within the meaning and range of equivalents of the appended claims.

I claim:

1. In an induction MHD generator having a flow channel for the flow of a conductive fluid medium in one direction through said channel the improvement that said channel is divided into a plurality of electrically insulated wall sections, and including laminated stator means defining at least one slot in the side thereof and wherein said wall sections are provided with flanges at their interconnecting edges and said flanges are arranged in said slot.

2. The improvement defined in claim 1 wherein said flow channel is divided in directions transverse to said one direction.

3. The improvement defined in claim 1 wherein said flow channel is divided in directions parallel to said one direction.

4. The improvement defined in claim 1 wherein said flow channel is divided in directions both transverse and parallel to said one direction.

5. The improvement defined in claim 1 wherein said flow channel is divided in directions which make an angle with said one direction.

6. The MHD generator defined in claim 1 further comprising a squeezer yoke arranged around said stator means and said flanges for holding said stator means and said flanges together.

References Cited

UNITED STATES PATENTS

| | | | |
|---|---|---|---|
| 3,271,597 | 9/1966 | Way | 310—11 |
| 3,345,523 | 10/1967 | Grunwald | 310—11 |
| 3,242,354 | 3/1966 | Novack | 310—11 |
| 3,260,209 | 7/1966 | Rhudy | 103—1 |
| 3,309,546 | 3/1967 | Boll | 310—11 |

OTHER REFERENCES

Book publication: MPD Elec. Pwr. Gen. IEE Report Series No. 4 of Symposium at Kings College, University of Durham, Sept. 6–8, 1962.

DAVID X. SLINEY Primary Examiner

U.S. Cl. X.R.

310—86